United States Patent Office 3,520,960
Patented July 21, 1970

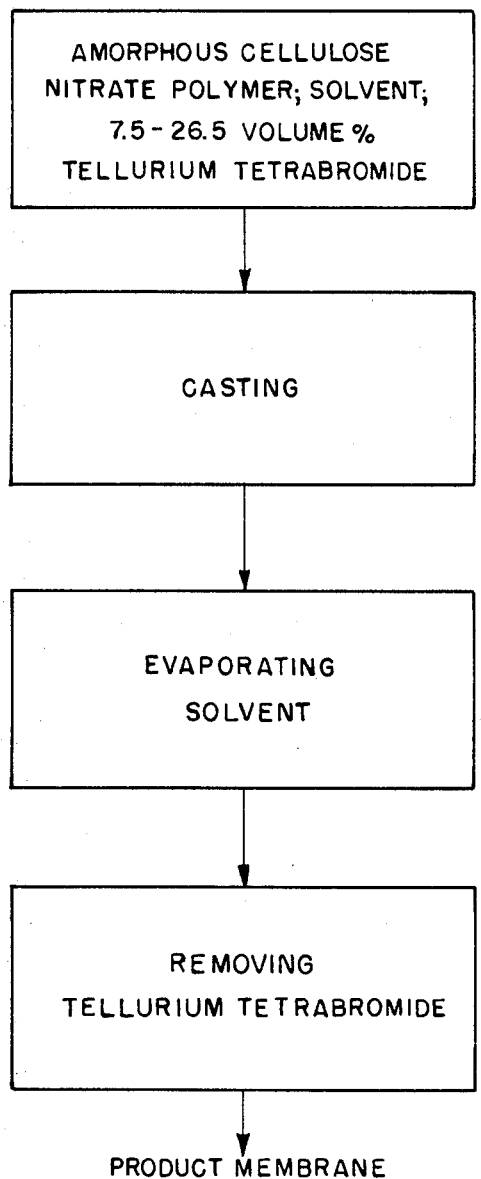

3,520,960
METHOD OF MAKING MICROPHOROUS
CELLULOSE NITRATE FILMS
Allan S. Douglas, Woburn, Mass., assignor, by direct and mesne assignments, of one-half to Massachusetts Institute of Technology, Cambridge, Mass., and one-half to the United States of America as represented by the Secretary of the Interior
Filed Mar. 22, 1967, Ser. No. 625,907
Int. Cl. B29d 27/04; C08b 5/02; C01b 7/10, 19/00
U.S. Cl. 264—49        8 Claims

ABSTRACT OF THE DISCLOSURE

Microporous films, or membranes, can be produced by casting solutions of amorphous glassy polymers which contain from about 7.5 volume percent to about 26.5 volume percent tellurium tetrabromide, drying the film and then washing out the tetrabromide. When the polymer is a partially nitrated form of cellulose nitrate, the film is useful in separating potable water from sea water by reverse osmosis.

DISCLOSURE

The present invention is concerned with new forms of plastic films, of membranes, which are obtainable from glassy, amorphous polymers. The films are useful in separating two components of a system from each other.

Membranes which are permeable to water have been used to determine the osmotic pressure of aqueous solutions of electrolytes and to separate water from electrolytes by the process of reverse osmosis. Membranes have also been used to separate simple molecules from complex molecules in the process of dialysis.

In the process of reverse osmosis, high pressure is applied to a solution such as sea water in a closed container, and the liquid flows through a membrane in a direction which is opposite to that of normal osmosis. In a continuous process for the separation of fresh water from sea water, brine flows at high pressure through the solution compartment such as shown by Loeb et al. in U.S. Pat. No. 3,133,132.

Various attempts have been made to produce membranes with controlled pore size to facilitate the separation of dissolved material from a solution. The films which have been prepared generally suffer from a variety of disadvantages. Many of them have pore sizes that are too big for most practical uses. Many of them in addition are too expensive to produce.

I have now discovered a means for making membranes in which the pore sizes can be controlled in a simple and economic manner. The resulting films are very useful in separating two components of a solution from each other. For example, when the film is made from a hydrophyllic glassy polymer, such as cellulose dinitrate, the membrane is exceptionally useful in separating fresh water from brine solutions, particularly when used in the reverse osmosis process. Other films made from glassy polymers which are not particularly hydrophyllic, such as polystyrene and methyl methacrylate are useful in separating two liquids dissolved in each other which have significantly different molecular sizes. The separation of two liquids by this process is exceptionally beneficial where the two liquids have substantially the same boiling point, making separation by distillation impractical or impossible, for example the separation of benzene (boiling point 80.1° C.) from cyclohexane (boiling point 81.4° C.).

In accordance with the present invention, the conventional process for casting a semipermeable membrane from a solution of a glassy polymer is employed. In this process a quantity of glassy polymer is dissolved in a solvent and the solution is poured onto a polished plate and drawn to a constant thickness film with a casting bar. When the solution of polymer also contains from about 7.5 volumes percent to about 26.5 volumes percent tellurium tetrabromide based on the polymer, the cast film can be made microporous by removing the tetrabromide from the film. This is easily accomplished by soaking the film in water and allowing the tetrabromide to dissolve out of the film.

A schematic flow plan illustrating the process steps is shown in the drawing.

Typical amorphous glassy polymers which may be used in this invention are cellulose nitrate, polystyrene or polymethyl methacrylate. The use of hydrophylic polymers such as cellulose dinitrate produces films which are exceptionally useful in separating fresh water from salt water. The hydrophobic polymers are not useful in separating water from salt water but are useful in separating a mixture of two liquids having substantially different molecular sizes. The hydrophobic films are selected depending upon the nature of the liquid which is to be separated out. For example, if liquid A is to be separated from a mixture of A and B, it will be advisable to select a glassy polymer which tends to absorb liquid A rather than repel it. Obviously, the film must be insoluble in either liquid.

One particular aspect of this invention I have discovered is, that when the glassy polymer is a hydrophyllic cellulose nitrate, a film can be formed which is exceptionally useful in the reverse osmosis process for separating potable water from salt solutions such as ordinary sea water. The film is prepared by dissolving a predetermined amount of tellurium tetrabromide in a solvent which is also a solvent for the cellulose nitrate. Examples of such solvent are ethylene glycol, monoethyl acetate, ethyl acetate, and tetrahydrofuran. Of these, tetrahydrofuran is preferred. It may then be desirable to filter the solution in order to eliminate any undissolved particles. Then the glassy polymer is dissolved in the solution. The amount of glassy polymer should be such that the tetrabromide content in the solution constitutes from about 7.5 volumes percent to about 26.5 volumes percent based on the amount of polymer in the solution. Particularly valuable films are obtained when the bromide constitutes from about 15 volumes percent to about 25 volumes percent based on the polymer. The solution then is cast in a known manner and drawn to a constant thickness. It is allowed to dry, then removed from the casting surface and immersed in a solvent for the tetrabromide. Water is the preferred solvent, for reasons of economy.

As a practical matter we have found it advisable to keep the film wet after immersion in water to remove the bromide. This minimizes the dangers of the film forming minute cracks which is more likely to happen if it is allowed to dry.

We have also found it advisable to cast the solution of polymer and nitrate shortly after the solution is completed. The films cast from solutions of cellulose dinitrate and tellurium tetrabromide have impaired water flow rate and impaired salt retention properties as the age of the solution increases, although not necessarily proportionally. Solutions which are no more than 48 hours old provide films which have satisfactory properties.

The thickness of the films which will be cast with these solutions can vary considerably, e.g., from about 0.5 mil to about 6 mils. As a practical matter they will preferably have a thickness from about 0.5 mil to about 1.0 mil.

EXAMPLE

In a typical preparation, 6.44 grams of tellurium tetrabromide are dissolved in 57 grams of tetrahydrofuran.

After filtering the solution, 7.54 grams of cellulose nitrate are added and permitted to dissolve. A membrane cast from the resulting solution contains 24.8% tellurium tetrabromide by volume.

What is claimed is:

1. A method for making a microporous film of hydrophyllic glassy amorphous cellulose nitrate polymer which comprises preparing in a solvent a film-forming solution of said polymer and tellurium tetrabromide in which the tetrabromide is present in a concentration of about 7.5 volumes percent to about 26.5 volumes percent based on said polymer, casting a film of constant thickness from the solution, evaporating solvent from said film, and removing the tetrabromide from the film.

2. The method of claim 1 wherein the solvent is tetrahydrofuran.

3. The method of claim 1 wherein the film is cast from the solution within 48 hours of the formation of the solution.

4. The process of claim 1 wherein the nitrate is cellulose dinitrate.

5. The process of claim 1 wherein the tetrabromide concentration is from about 15 volumes percent to about 25 volumes percent.

6. A process of claim 3 wherein the constant thickness of the film is a substantially constant value from approximately 0.5 mil to approximately 1.0 mil.

7. A method of claim 3 wherein the cast film is evaporated to dryness.

8. A method of claim 7 wherein the tetrabromide is removed from the film by immersing the film in water.

References Cited

UNITED STATES PATENTS

| | | | |
|---|---|---|---|
| 2,884,387 | 4/1959 | Bieber et al. | 264—41 XR |
| 2,926,104 | 2/1960 | Goetz | 264—41 XR |
| 3,216,882 | 11/1965 | Feldt et al. | 264—41 XR |

OTHER REFERENCES

U.S. Office of Saline Water, "Saline Water Conversion Report for 1964," pp. 38–41.

PHILIP E. ANDERSON, Primary Examiner

U.S. Cl. X.R.

106—195; 210—500; 264—299